United States Patent [19]   [11]  4,028,291
Tsuchiya et al.                       [45]  June 7, 1977

[54] PROCESS FOR THE PRODUCTION OF RESINS FOR PRINTING INK

[75] Inventors: Shozo Tsuchiya, Kawasaki; Hisatake Sato, Yokohama; Akio Oshima, Yokohama; Hideo Hayashi, Yokohama, all of Japan

[73] Assignee: Nippon Oil Company Ltd., Tokyo, Japan

[22] Filed: Sept. 29, 1975

[21] Appl. No.: 617,486

Related U.S. Application Data

[63] Continuation-in-part of Ser. No. 434,140, Jan. 17, 1974, abandoned.

[30] Foreign Application Priority Data

Jan. 23, 1973   Japan .................... 48-9137

[52] U.S. Cl. .................. 260/23.7 C; 260/27 BB; 260/38
[51] Int. Cl.² .................................. C08L 91/00
[58] Field of Search ............... 260/23.7 C, 22, 5

[56] References Cited

UNITED STATES PATENTS

| 1,982,707 | 12/1934 | Thomas | 260/23.7 C |
| 2,392,140 | 1/1948 | Gerhart | 260/23 R |
| 2,392,732 | 1/1946 | Gerhart | 260/23.7 C |
| 2,522,889 | 9/1950 | Peters | 260/23.7 C |
| 2,551,387 | 5/1951 | Moffett | 260/23.7 C |
| 3,445,411 | 5/1969 | Dunham et al. | 260/23.7 C |
| 3,453,224 | 6/1969 | Tatt | 260/23.7 C |

FOREIGN PATENTS OR APPLICATIONS 715,228   9/1954   United Kingdom .......... 260/23.7 C Primary Examiner—Lewis T. Jacobs
Assistant Examiner—William E. Parker
Attorney, Agent, or Firm—Sherman & Shalloway

[57] ABSTRACT

Resins for printing ink and particularly offset ink, are produced by reacting a resin obtained by heat polymerizing at least one of cyclopentadiene, dicyclopentadiene or their alkyl substituted derivatives with 1–3 carbons and an unsaturated alcohol or unsaturated alcohol ester of an organic acid at a temperature of 150–350° C. in the presence or in the absence of an inert hydrocarbon solvent with a higher monohydric saturated fatty acid or higher monohydric unsaturated fatty acid or their mixtures to produce a resin having a softening point of 100° C or more.

7 Claims, No Drawings

PROCESS FOR THE PRODUCTION OF RESINS FOR PRINTING INK

This application is a continuation-in-part of our earlier application, Ser. No. 434,140 filed Jan. 17, 1974 now abandoned.

The present invention is concerned with novel high softening modified resins used for printing ink, particularly offset printing inks; and to the process for preparing these resins.

U.S. Pat. No. 5,522,889 to Peters relates to a resinous composition which is prepared by the thermal polymerization reaction between cyclopentadiene and essentially fatty acids. The solid or liquid resinous product is suitable for incorporation into drying oils to produce surface coating compositions useful in the paint and varnish field.

U.S. Pat. No. 2,398,889 to Gerhart discloses a process for the polymerization of cyclopentadiene using a polymerization catalyst, i.e., Friedel-Crafts type catalyst, which has air drying properties and is soluble in a number of hydrocarbon solvents. It is also taught by Gerhart that the polymerization of the cyclopentadiene may take place in the presence of a vegetable or animal glyceride such as soya bean oil, linseed oil, fish oil, or China-wood oil. It is also possible to employ the free acid hydrolysis products of glycerides such as soya acids, linseed acids, etc.

U.S. Pat. No. 2,551,387 to Moffett et al. discloses compositions based on copolymers of an unsaturated glyceride oil and a conjugated cyclic hydrocarbon and more particularly copolymers of a drying oil such as linseed oil or soya bean and cyclopentadiene. Moffett et al. describe an improvement in such resinous copolymer compositions of unsaturated glyceride oils and cyclopentadiene or dicyclopentadiene which includes the incorporation of esters of fatty acids and ether type glycols with oils containing the copolymers. The esters of fatty acids and ether type glycols are generally esters of polyethyleneglycol and an unsaturated fatty acid. The drying oil is described as an unsaturated glyceride oil and is apparently a glycerine ester of an unsaturated higher fatty acid, that is, the alcohol component of this ester is a glycerine of a saturated alcohol. The ester of fatty acid and ether type glycols disclosed for use by Moffett et al. is based on a saturated alcohol component.

Thomas discloses in U.S. Pat. No. 1,982,707 the resinous reaction product of a mixture of unsaturated hydrocarbons containing a cyclic diolefin and an alkyl benzene in the presence of a metallic halide catalyst. Thomas suggests the use of a neutralization treatment to terminate the polymerization reaction and suggests for this purpose the use of water soluble alkalies and an organic hydroxy compound. As described on page 2, lines 97–103 of this patent, the organic hydroxy compound supplies hydroxyl radicals for the decomposition and precipitation of the aluminum chloride or other activating agent.

British Pat. No. 715,228 to the Pittsburgh Plate Glass Co. relates to copolymers of cyclopentadiene with an unsaturated glyceride oil and in addition with a liquid monomeric ethylenically unsaturated polymerizable compound, such resinous copolymers having utility as drying oils and coating compositions and generally in the field of synthetic resins for the production of films or coatings. The unsaturated glyceride oil is one in which the alcohol component is a saturated alcohol.

The process of the British patent is related to the preparation of a resin by copolymerizing three components, namely (1) cyclopentadiene or its oligomer with (2) an unsaturated glyceride oil and (3) an ethylenically unsaturated compound.

More specifically, the British patent teaches that component (1)-cyclopentadiene or its oligomer is preliminarily reacted with component (3)-ethylenically unsaturated compound to produce a liquid or solid copolymer which is thereafter heated with component (2)-unsaturated glyceride oil, such reaction resulting in a terpolymer.

In direct contrast to the foregoing, the present invention contemplates the reaction between (a) cyclopentadiene or dicyclopentadiene or a derivative with (b) unsaturated alcohol or unsaturated alcohol ester to provide a resin having an hydroxyl value of 30–300 which is subsequently esterified or subject to ester-exchange reaction by the reaction with saturated or unsaturated fatty acid. Only components (a) and (b) are copolymerized to form a two-component copolymer. The reaction with component (c) does not form a terpolymer but, rather, causes the esterification of the two-component copolymer. In one embodiment component (b) is an unsaturated alcohol ester and component (c) undergoes the ester-exchange reaction. Again, the present invention is directed to the esterification of a two-component copolymer and is not concerned with a process for the formation of a terpolymer.

Accordingly, unlike the British patent, which is concerned with the terpolymerization of cyclopentadiene or dicyclopentadiene with ethylenically unsaturated compound and unsaturated glyceride oil, the process of the present invention is directed to the production of a resin suitable for offset printing inks by the esterification or ester-exchange reaction of a fatty acid with a resin obtained by the reaction between cyclopentadiene or dicyclopentadiene and unsaturated alcohol or unsaturated alcohol ester.

More particularly the present invention relates to a modified resin for printing ink having a softening point of 100° C. or more; such modified resin is produced by reacting a higher fatty acid with a resin (hereinafter referred to as intermediary resin) obtained by heat-polymerizing cyclopentadiene, dicyclopentadiene or $C_1 - C_3$ alkyl substituted derivatives thereof with an unsaturated alcohol, such as allyl alcohol, crotyl alcohol and the like, or an unsaturated alcohol ester of an organic acid, such as vinyl ester, allyl ester and the like.

Alkylphenol resin, rosin-modified phenol resin, resin-modified alkyd resin, maleic acid resin are typical of resins which have been highly regarded for their excellent properties as resins used in varnishes for printing inks. However, current printing processes require even a higher rate of printing speed, and many studies have been made to cope with the pressing demand for high softening resins which excel not only in drying property but also in printing effects, such as gloss, luster, etc. Nevertheless, these efforts have not yet successfully provided resins which equal or outstrip rosin type resins, such as rosin-modified phenol resin and the like. In addition, because it is a naturally occuring substance, the use of rosin as a starting material has many drawbacks, such as an unstable supply, as well as high costs. Accordingly, the development of resins for printing ink instead of rosin type resins is required.

Petroleum resins obtained by polymerizing cracked oil fractions are available in large quantities as by-products in the petroleum or petrochemical industry; and these resins have the advantage of stability both in their supply and in their costs but are far from satisfactory in their qualities when used as resin for printing inks. It would therefore be desirable if petroleum resins could be utilized as a source for resins for printing ink. However, a resin derived from petroleum resin which has the requisite properties for use in printing inks, particularly offset printing ink has not yet been developed.

The basic properties required of printing ink and offset ink, in particular, are as follows:

1. Values indicative of flowability, such as viscosity and yield value, should be moderate.
2. Since a drawing line is formed on the plane with water and ink adjoined, an interfacial balance should be maintained between the water retaining part and thick part.
3. Pigment dispersibility should be good.
4. Gloss on the printed surface should be in a good condition and printed matter should be uniform.
5. Setting time and drying time should be both rapid and without blocking.
6. Printed surface should be good in abrasion resistance and the like.

In order to meet the above capabilities required of an offset ink the properties of the resin used therefor should satisfy the following requirements:

1. It has a high softening point but is not of a high molecular weight.
2. It has a polar group having good affinity for pigments.
3. It has enough solubility in high boiling hydrocarbon solvents of a low aromatic content used for offset ink.
4. It has enough solubility in dry oils, such as linseed oil for example.

Accordingly, the present invention provides resins for printing ink exhibiting a capability greater than rosin type resins, which are provided with a variety of characteristics required of offset ink, in particular, and prepared from the starting materials available both in large quantities and at much lower costs from the petrochemical industry.

The inventors of this application have discovered that the above objectives can be achieved with a modified resin having a softening point of 100° C. or more obtained by first reacting at least one of cyclopentadiene, dicyclopentadiene and $C_1$–$C_3$ alkyl substituted derivatives thereof (hereinafter these will be generally called dicyclopentadienes) and unsaturated alcohol or unsaturated alcohol ester of organic acid, followed by reacting the intermediary resin so obtained with higher saturated fatty acid or higher unsaturated fatty acid. There is thus produced a modified resin having a specifically excellent capability as resin for printing ink, especially offset printing ink.

The modified resin of the present invention obtained in the above manner has a three-dimensional bulky structure, and it is excellent in its solubility in dry oils and high boiling solvents used for printing ink. Consequently, printing ink using this modified resin has excellent flowability without causing misting to occur and exhibits its excellent properties even in printing effects of printed matter, such as gloss, luster and so on.

The present invention will be explained in greater detail as follows.

The intermediary resin having a reactivity for fatty acids can be obtained by causing heat-polymerization between one or more types of dicyclopentadienes and unsaturated alcohol, such as allyl alcohol or crotyl alcohol, in the absence of catalyst, or by causing heat-polymerization between one or more types of dicyclopentadienes and unsaturated alcohol ester of organic acid capable of forming alcoholic hydroxyl groups on hydrolysis, such as vinyl ester and allyl ester of organic acid, in the absence of catalyst. The heat-polymerization reaction is carried out by charging dicyclopentadienes and unsaturated alcohol or unsaturated alcohol ester of organic acid in a sealed vessel to heat-polymerize at a temperature falling within the range of 150° – 350° C., preferably in the range of 200° – 300° C., during a period of 30 minutes to 15 hours. It is possible to obtain the intermediary resin by conducting the above reaction without adding any inert hydrocarbon solvent to the mixture of dicyclopentadienes and unsaturated alcohol or unsaturated alcohol ester of organic acid, but it is usually preferred to use solvents in order to facilitate the removal of the reaction heat at the time of the heat-polymerization reaction, and to provide greater control over the molecular weight and softening point of the intermediary resin. Inert hydrocarbon solvents, such as benzene, toluene, xylene, isooctane, solvent naphtha and the like can be used as the hydrocarbon solvent.

After the dicyclopentadienes and unsaturated alcohol or unsaturated alcohol ester of organic acid are reacted at the temperature and period of time indicated above the unreacted monomer, low molecular weight polymer and solvent are separated by evaporation or distillation, to yield intermediary resin.

When the heat-polymerization is between dicyclopentadienes and unsaturated alcohol, the intermediary resin so obtained contains alcoholic hydroxyl groups in its molecules and is therefore capable of reacting with higher fatty acid by an esterification reaction. When the heat-polymerization is between dicyclopentadienes and unsaturated alcohol ester of organic acid, the intermediary resin so obtained does not have any alcoholic hydroxyl groups but has ester bond residues instead. When this intermediary resin is reacted with higher fatty acid, the higher fatty acid is attached to the resin via an ester bond by acidolysis reaction; therefore, the intermediary resin obtained by the heat-polymerization between dicyclopentadienes and unsaturated alcohol ester of organic fatty acid is equivalent to the intermediary resin obtained by the heat-polymerization between dicyclopentadienes and unsaturated alcohol for the purposes of the present invention. If, prior to reacting the intermediary resin obtained with the alcohol ester of organic fatty acid with higher fatty acid, the ester bond residues are preliminarily converted into alcoholic hydroxyl groups on hydrolysis, the reaction with higher fatty acid can be more smoothly conducted, and such process is desirable and falls within the scope of the present invention. In the instant specification, the term "hydroxyl value of resin" may also apply to the intermediary resin obtained by the heat-polymerization between dicyclopentadienes and unsaturated alcohol ester of organic acid. In this case, it implies a hydroxyl value equivalent to the value obtained when the ester bond residues are perfectly converted into alcoholic hydroxyl groups on hydrolysis.

In the above heat-polymerization reaction, by properly selecting the monomer concentration, reaction temperature and reaction time, it is possible to suitably adjust the molecular weight and softening point of the intermediary resin to the desired values.

It is not necessary that the cyclopentadiene, dicyclopentadiene or alkyl substituted derivatives thereof be of high purity, but it is preferred that cyclopentadiene, dicyclopentadiene or their alkyl substituted derivatives exist in an amount of at least 80% by weight. For instance, concentrated fractions obtained by forming mixtures of dicyclopentadiene, dimethylcyclopentadiene-isoprene co-dimer, cyclopentadiene-piperylene co-dimer and so forth can be used by heat-dimerizing cyclopentadiene and methylcyclopentadiene contained in $C_5$ fractions of high temperature pyrolyzed by-product oils, such as naphtha, followed by removing off the greater part of $C_5$ components, such as $C_5$ olefin, $C_5$ paraffin and so on, by distillation.

Unsaturated alcohols used in the present invention are monoethylenically unsaturated monohydric alcohols of 3 to 22 carbon atoms and are heat-copolymerizable with cyclopentadienes; examples of the unsaturated alcohols include allyl alcohol, methallyl alcohol, crotyl alcohol, cinnamyl alcohol, methylvinylcarbinol, allylcarbinol, methylpropenylcarbinol, and the like, and preferably aliphatic monohydric alcohols of 3 to 10 carbon atoms.

Unsaturated alcohol ester of organic acid used in the present invention are esters of monoethylenically unsaturated monohydric alcohol of 2 to 22 carbon atoms with aliphatic or aromatic organic acid of 2 to 22 carbon atoms; examples of the unsaturated alcohol ester include vinyl acetate, trimethyl vinyl acetate, isopropenyl acetate, vinyl propionate, vinyl butyrate, vinyl benzoate, allyl acetate, allyl propionate, allyl caproate, allyl benzoate, and the like. It is desirable that the organic acid component forming this ester is preferably a monohydric saturated organic acid of 2 to 4 carbon atoms. The unsaturated alcohol component forming the ester is the same unsaturated alcohol mentioned above, as well as vinyl alcohol. The amount of these unsaturated alcohols and unsaturated alcohol esters of organic acid based on dicyclopentadiene is selected to provide the hydroxyl value of the intermediary resin within the range of from 30 – 300, particularly 40 – 200. The hydroxyl value of the resin is measured according to the pyridine-acetic anhydride method. [Manual for chemical products of fat and oil (Nikkan Kogyo Shimbunsha).] When the hydroxyl value of the resin is 30 or less, even by the subsequent esterification reaction, it is impossible to obtain a modified resin having sufficient solubility in high boiling solvents and oils for ink; it is also less in the amount of polar groups, so that when used for offset ink, it provides unsatisfactory pigment dispersibility and is so poor in its ink flowability, as well as in gloss and lustre of printed matter that it is not possible to obtain ink having a sufficient capability.

If the hydroxyl value of the resin is 300 or more, when the esterification reaction is carried out by adding higher fatty acid in the corresponding amount of the hydroxyl value the softening point of the modified resin so obtained is lowered and when used as a resin for ink, it becomes extremely slow in the ink drying rate and it exhibits an unsatisfactory rate of occurrence of misting. When the higher fatty acid is used in lesser amounts, it is true that lowering of the softening point of the modified resin is prevented, but alcoholic hydroxyl groups remain in the resin obtained; for example, when the hydroxyl groups remain at a value of 200 or more, in particular, when used for offset ink, it is made impossible to obtain a sufficient solubility both in high boiling solvents and in oils for ink and it is so poor in the ink flowability that ink having a sufficient capability cannot be obtained. In view of this, the hydroxyl value of the resin is suitably 30–300.

The intermediary resin having ractivity for higher fatty acids obtained as described above (herinafter may sometimes be called an esterification reactive resin) is then esterified (by esterification or acidolysis) with higher fatty acid. The amount of the higher fatty acid used during the esterification or acidolysis reaction, on the basis of the esterification reactive resin is usually 0.2 – 1.1 moles of higher fatty acid, preferably 0.5 – 1.0 mole for every mole of the hydroxyl amount of the esterification reactive resin. When the amount of the higher fatty acid based on the esterification reactive resin is 0.2 mole or less for every mole of the hydroxyl group, there is no significant change in the properties of the esterification reactive resin and the modified resin is so poor in its solubility in ink solvents that it cannot exhibit a sufficient capability when made into ink.

The above esterification or acidolysis reaction is conducted, for instance, within a temperature range of 180° – 280° C. during a period of 30 minutes to 10 hours by adding higher fatty acid at conditions such that the esterification reactive resin is heated and melted, or dissolved in hydrocarbon solvents, such as benzene, toluene, xylene and so on. When the esterification or acidolysis reaction is carried out in the presence of solvent, it is required, as the case may be, to remove off the solvent by means of distillation after the reaction is finished. In this instance, it is desired to remove by distillation water or fatty acids that are formed during the esterification reaction or the acidolysis. When water or fatty acids remain in the resin, they cause various disadvantages to the resin. For instance, they lower the softening point and solubility of the resin in hydrocarbon solvent when the resin is used for an offset printing ink, increase the acid value of the resin and deteriorate the characteristics of the ink.

When the acidolysis reaction is employed in the present process, fatty acids are by-produced as noted above. For effective removing of fatty acids by distillation, the fatty acids have preferably 2 to 4 carbons. For this reason, the organic acid component forming the ester with the monoethylenically unsaturated monohydric alcohol of 2 to 22 carbons is preferably a monohydric saturated organic acid of 2 to 4 carbons, as noted previously.

Higher fatty acids that can be used in the present invention include saturated monohydric, unsaturated monohydric and their mixed higher fatty acids, and any higher fatty acid with 8 or more carbon atoms preferably with 10 or more carbon atoms. The upper limit of carbon atoms is preferably 24. For instance, oleic acid, linoleic acid, linolenic acid, ricinoleic acid, myristic acid, palmitic acid, stearic acid and so forth can be used and these may also be used in combinations of two or more. Therefore, it is possible to produce the modified resin with ease even by using one or more types of mixed higher fatty acids, such as fatty acids of the respective seed oils of linseed oil, perilla oil, tung oil, soybean oil, cotton seed oil, sesame oil, rape oil, olive oil, Tsubaki oil, castor oil, tall oil and so forth.

Further, part of these higher fatty acids may be replaced with rosin, and by causing the reaction by adding about 10% of resol form phenol resin to the esterification reactive resin on the occasion of conducting the esterification reaction or acidolysis it is made possible to enhance the softening point of the resin obtained and to improve the setting time and drying time when made into ink.

The modified resin of the present invention is good in its stability against oxidation, and it is not usually required to add antioxidants, but if need be, it is allowed to add antioxidants, such as 2,6-di-tert-butyl phenol.

The modified resin of the present invention is required to have a softening point of 100° C. or more. If the softening point of the modified resin is lower than 100° C., when made into printing ink, mistings occur so frequently and the drying rate is so extremely lowered that blocking easily takes place.

The present invention is characterized by causing the reaction between the dicyclopentadiene resin having an esterification reactivity and the higher fatty acid, and its novelty lies in this respect.

Some of the advantageous characteristics of the present invention can be summarized as follows:

1. The modified resin obtained by the process of the present invention can independently be used in inks of the respective colors as a new offset ink resin and has equivalent or even more printing effect and printability in comparison to the heretofore used rosin-modified phenol resin, alkylphenol resin and the like. In addition, the modified resin of the present invention can be produced at lower cost than the rosin-modified phenol resin.

2. Offset ink can be produced following the same recipe and production method as with the conventionally used resins, and in view of this, it is not required to install new equipment for the conversion of ink. That is to say, offset ink can be obtained by incorporating the pigment and the like into the varnish in which 100 parts of the modified resin of the present invention was dissolved in 0 – 150 parts of oil, such as dry oil, and 0 – 100 parts of petroleum type solvent at room temperature or at an elevated temperature and adjusted so as to have about 500 poises, followed by kneading by means of rolls and the like.

3. If need be, it can be used in conjunction with the conventional resins.

4. Because a light-colored resin can be obtained, it allows good reproducibility of the color tone even when any kind of pigment is used, and is also good in the color development.

5. It can be produced through relatively easy steps and is less expensive in the costs required for its production.

The following Examples are shown for the purpose of specifically clarifying the content of the present invention. It is to be understood, however that these examples are illustrative rather than limiting.

EXAMPLE 1

A 2-liter stirrer-equipped autoclave was charged with 730 g of dicyclopentadiene (DCPD) having a purity of 97%, 100 g of allyl alcohol and 370 g of commercially available mixed xylene for industrial use and reacted at a temperature of 265°–270° C. for 7 hours. Subsequent to the completion of the reaction, the autoclave was cooled and then the contents were distilled to remove off the unreacted monomer, low molecular weight polymer and xylene. 786 g of dicyclopentadiene resin containing hydroxyl groups (I) was obtained. This intermediary resin (I) had a softening point of 176° C., hydroxyl value of 74 and bromine value of 105. The resin (I) so obtained was placed in a reaction vessel equipped with stirrer, thermometer, side arm water trap and condenser, and xylene was added to facilitate the removal of formed water and melted by heating at 230° C. while refluxing. Commercially available linseed oil fatty acid was added with stirring at a rate of 30 g based on 100 g of the resin (I) and reacted during a period of 5 hours, whereby modified resin (I-E) was obtained. The modified resin (I-E) had a softening point of 123° C., hydroxyl value of 11 and bromine value of 72.

EXAMPLE 2

A 2-liter stirrer-equipped autoclave was charged with 750 g of DCPD with a purity of 95%, 100 g of crotyl alcohol and 200 g of mixed xylene and reacted at 275° C. for 6 hours. After the reaction was finished, the mixture was treated in the same manner as in Example 1 and 800 g of resin containing hydroxyl groups (II) was obtained. This intermediary resin (II) had a softening point of 165° C., hydroxyl value of 55 and bromine value of 93.

This resin (II) was placed in the same reaction vessel as in Example 1 and melted by heating at 230° C. Tall oil fatty acid was added thereto at a rate of 25 g based on 100 g of the resin (II) and reacted for 6 hours, whereby modified resin (II-E) was obtained. The modified resin (II-E) had a softening point of 118° C., hydroxyl value of 6 and bromine value of 68.

EXAMPLE 3

A $C_5$ cracked oil fraction (boiling point 28°–60° C.) formed as a by-product from steam cracking of naphtha to produce ethylene, propylene and so forth was heated at 120° C. for 4 hours, and $C_5$ fraction was removed off by distillation. The residue contained 85% by weight of DCPD and in addition, codimers of cyclopentadiene and isoprene or piperylene. 170 g of the fraction containing 85% of this DCPD, 100 g of cinnamyl alcohol and 60 g of mixed xylene were placed in the autoclave and reacted at 285° C. during a period of 10 hours. After the reaction was finished, the mixture was treated in the same way as in Example 1, whereby 245 g of resin containing hydroxyl group (III) was obtained. The intermediary resin (III) had a softening point of 117° C. and hydroxyl value of 175.

This resin (III) was placed in the same reaction vessel as in Example 1 and melted by heating at 250° C.. 50 g of castor oil fatty acid and 10 g of malein-converted rosin based on 100 g of the resin (III) were added and reacted for 5 hours, whereby modified resin (III-E) was obtained. The modified resin so obtained had a softening point of 132° C. and hydroxyl value of 35.

EXAMPLE 4

240 g of DCPD with a purity of 97%, 100 g of vinyl acetate and 80 g of isooctane were placed in the autoclave and reacted at 275° C. for 7 hours. After the reaction was finished, the mixture was treated in the same way as in Example 1, whereby 292 g of resin was obtained. 100 g of the resin so obtained was dissolved in 300 c.c. of n-propyl alcohol, and 100 c.c. of n-propyl alcohol containing 30 g of caustic soda was further added and maintained at a temperature of 35° C. for 1 hour. The precipitated resin was separated off and it was washed with water to obtain intermediary resin (IV). The resin (IV) had a softening point of 131° C. and hydroxyl value of 192.

This resin (IV) was placed in the same reaction vessel as in Example 1, and while it was melted by heating at 210° C., 50 g based on 100 g of the resin (IV) of eleostearic acid was added and reacted for three hours. After that, 10 g of resol type phenol resin was added and reacted for another hour, whereby modified resin (IV-E) was obtained. The modified resin (IV-E) had a softening point of 110° C. and hydroxyl value of 85.

COMPARATIVE EXAMPLE 1

The resin containing hydroxyl groups (III) obtained in Example 3 was used as it was without modification.

In the next place, varnish was prepared according to the following recipe by using resins of the above Examples 1–4 and Comparative Example 1. Ink was prepared by using this varnish to test ink characteristics.
(Preparation of varnish)

70 g of linseed oil was added with respect to 100 g of the product resin and heated at 230° C. for 2 hours. After that, 40 g of petroleum type hydrocarbon solvent (specific gravity 0.85², aniline point 72.8, initial distillation point 272° C., end point 308° C.) was added and uniformly mixed to prepare varnish.
(Preparation of ink)

By using three rolls, the following ingredients were kneaded at the composition rate as described below. However, the amount of the petroleum type hydrocarbon solvent was suitably adjusted so that the tack value of ink became $10 \pm 0.5$.

| | |
|---|---|
| carmine 6B * | 18 g |
| Varnish | 67 g |
| Solvent | 5–10 g |
| Abrasion resistant Compound | 3 g |
| Dryer for ink | 2 g |

*Carmine 6B is the common name for the pigment having the formula:

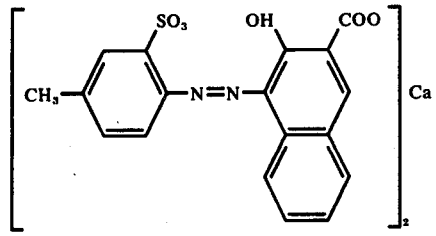

PERFORMANCE TEST AND RESULT

Gloss: 0.4 c.c. of ink was extended on art paper using an RI tester, and allowed to stand for 24 hours. Then, the gloss was measured by a 60° — 60° glossmeter.

Setting time: After extending 0.4 c.c. of ink on art paper by means of the above-mentioned RI tester, another sheet of art paper was superimposed on the ink-extended surface of the art paper. Using an RI tester roller, the degree of adhesion of ink to the superimposed art paper was observed with the lapse of time, and the time elapsed until there was no adhesion of ink was measured.

Misting: 2.4 c.c. of ink was placed on Inkometer and rotated for 3 minutes at 1200 rpm. The degree of scattering of ink to art paper placed under the roll was observed.

Drying time: 0.4 c.c. of ink was spread on art paper using the above-mentioned RI tester, and then the drying time was measured by an ink drying tester.

The test results are shown in the following table.

| Type of resin | Varnish viscosity poises (25° C.) | Gloss | Setting time (min.) | Drying time (hr.) | Misting |
|---|---|---|---|---|---|
| I-E | 310 | 65 | 11 | 6.0 | Not occurred |
| II-E | 280 | 66 | 11 | 5.5 | Not occurred |
| III-E | 320 | 68 | 10 | 5.5 | Not occurred |
| IV-E | 280 | 65 | 8 | 5.0 | Not occurred |
| Comparative Example 1 | 320 | 42 | 13 | 7.0 | Slightly occurred |
| Control resin | 310 | 58 | 10 | 6.0 | Not occurred |

Control resin:
Varnish was prepared by adding 100 g of linseed oil to 100 g of rosin-modified phenol resin (Beckacite 1126, a product of Dainippon Ink and Chemicals Inc.) and heating the mixture for 30 minutes, followed by adding 40 g of the aforesaid petroleum type hydrocarbon solvent.

The present invention has been described in detail with particular reference to preferred embodiments thereof, but it will be understood that variations and modifications can be effected within the spirit and scope of the invention as described hereinabove and in the appended claims.

What we claim is:

1. A process for the production of resins for offset printing ink comprising reacting an intermediary resin obtained by heat polymerizing, in the absence of a catalyst, at least one of cyclopentadiene, dicyclopentadiene and $C_1$ to $C_3$ alkyl substituted derivatives thereof and an unsaturated alcohol or unsaturated alcohol ester of organic acid wherein said unsaturated alcohol is a monoethylenically unsaturated monohydric alcohol of 3 to 22 carbon atoms and said unsaturated alcohol ester of organic acid is an ester of monoethylenically unsaturated monohydric alcohol of 2 to 22 carbon atoms with aliphatic or aromatic organic acid of 2 to 22 carbon atoms, at a temperature of 150° to 350° C. in the presence or in the absence of an inert hydrocarbon solvent, wherein the hydroxyl value of said intermediary resin is 30–300, with a higher monohydric saturated fatty acid or higher monohydric unsaturated fatty acid or their mixtures at a temperature ranging from 180°–280° C. to form the corresponding ester by esterification or ester-exchange to produce a resin having a softening point of 100° C or more wherein the amount of said higher monohydric saturated fatty acid or higher monohydric unsaturated fatty acid or their mixtures used is 0.2–1.1 moles for every mole of the hydroxyl amount determined from the hydroxyl value of said intermediary resin.

2. The process according to claim 1 wherein the hydroxyl value of said intermediary resin is 40–200.

3. The process according to claim 1 wherein said higher monohydric saturated fatty acid or higher monohydric unsaturated fatty acid has 8 to 24 carbon atoms.

4. The process according to claim 1 wherein the reaction between the intermediary resin and higher monohydric saturated or unsaturated fatty acid or mixture thereof is carried out during a reaction period of 30 minutes to 10 hours.

5. The process according to claim 1 wherein said intermediary resin is obtained by the heat polymerization of said cyclopentadiene, dicyclopentadiene or the $C_1$ to $C_3$ alkyl substituted derivative thereof with an unsaturated alcohol selected from the group consisting of allyl alcohol, methallyl alcohol, crotyl alcohol, cinnamyl alcohol, methylvinylcarbinol, allylcarbinol and methylpropenylcarbinol.

6. The process according to claim 5 wherein said unsaturated alcohol is allyl alcohol.

7. The process according to claim 1 wherein said intermediary resin is obtained by the heat polymerization of said cyclopentadiene, dicyclopentadiene or the $C_1$ to $C_3$ alkyl substituted derivative thereof with an unsaturated alcohol ester of an organic acid selected from the group consisting of vinyl acetate, trimethyl vinyl acetate, isopropenyl acetate, vinyl propionate, vinyl butyrate, vinyl benzoate, allyl acetate, allyl propionate, allyl caproate and allyl benzoate.

* * * * *